United States Patent
Bergami (10) Patent No.: US 10,874,973 B2
(45) Date of Patent: *Dec. 29, 2020

(54) VEHICLE PROVIDED, AT THE INTAKE, WITH AN AIR FILTER PROVIDED WITH A HEATING DEVICE

(71) Applicant: BMC S.R.L., Medicina (IT)

(72) Inventor: Gaetano Bergami, Medicina (IT)

(73) Assignee: BMC S.R.L., Medicina (IT)

( * ) Notice: Subject to any disclaimer, the term of this patent is extended or adjusted under 35 U.S.C. 154(b) by 252 days.

This patent is subject to a terminal disclaimer.

(21) Appl. No.: 16/063,977

(22) PCT Filed: Dec. 30, 2016

(86) PCT No.: PCT/IB2016/058111
§ 371 (c)(1),
(2) Date: Jun. 19, 2018

(87) PCT Pub. No.: WO2017/115331
PCT Pub. Date: Jul. 6, 2017

(65) Prior Publication Data
US 2019/0224607 A1  Jul. 25, 2019

(30) Foreign Application Priority Data
Dec. 30, 2015  (IT) ........................ 102015000088985

(51) Int. Cl.
*B01D 46/10* (2006.01)
*B64D 33/02* (2006.01)
(Continued)

(52) U.S. Cl.
CPC ..... *B01D 46/4263* (2013.01); *B01D 46/0086* (2013.01); *B01D 46/10* (2013.01);
(Continued)

(58) Field of Classification Search
CPC ................ B01D 46/4263; B01D 46/10; B01D 46/0086; B01D 46/521; B01D 2275/206;
(Continued)

(56) References Cited

U.S. PATENT DOCUMENTS 2,879,183 A * 3/1959 Doherty ................. H01B 3/004
427/118
5,527,569 A * 6/1996 Hobson .............. B01D 39/1692
428/35.2
(Continued)

FOREIGN PATENT DOCUMENTS

CN 101539057 A 9/2009
CN 202789233 U 3/2013
(Continued)

OTHER PUBLICATIONS

International Search Report and Written Opinion issued in PCT/IB2016/058111 dated Apr. 5, 2017.
(Continued)

*Primary Examiner* — Minh Chau T Pham
(74) *Attorney, Agent, or Firm* — Workman Nydegger (57) ABSTRACT

A vehicle provided with an engine, at least one air intake opening through which the engine takes in the external air needed to operate, and an air filter, which is arranged in the area of the air intake opening; the air filter has: at least one wave-shaped filtering material element; an outer reinforcement mesh; an inner reinforcement mesh; and a heating device, which is electrically connected to a group of electrified wires of the outer reinforcement mesh and is designed to cause an electric current to flow through the electrified wires, so as to generate heat, due to Joule effect, on the inside of the outer reinforcement mesh.

15 Claims, 7 Drawing Sheets

(51) Int. Cl.
*F02C 7/047* (2006.01)
*B01D 46/42* (2006.01)
*B01D 46/00* (2006.01)
*B01D 46/52* (2006.01)
*F02C 7/052* (2006.01)

(52) U.S. Cl.
CPC ............ *B01D 46/521* (2013.01); *B64D 33/02* (2013.01); *F02C 7/047* (2013.01); *F02C 7/052* (2013.01); *B01D 2265/06* (2013.01); *B01D 2275/206* (2013.01); *B01D 2279/60* (2013.01); *B64D 2033/0253* (2013.01); *F05D 2220/329* (2013.01); *Y02T 50/60* (2013.01)

(58) Field of Classification Search
CPC . B01D 2279/60; B01D 2265/06; F02C 7/047; F02C 7/0052; Y02T 50/672; B64D 2033/0253; B64D 33/02; F05D 2220/329
USPC ..... 55/385.3, 306, DIG. 34; 95/273; 96/417; 60/39.092, 779
See application file for complete search history.

(56) References Cited

U.S. PATENT DOCUMENTS

| | | | | |
|---|---|---|---|---|
| 6,117,802 | A * | 9/2000 | Rohrbach | D01D 5/24 428/372 |
| 6,734,122 | B1 * | 5/2004 | Hunter | B01D 39/086 428/181 |
| 2005/0229558 | A1 * | 10/2005 | Stelzer | B01D 46/10 55/385.3 |
| 2009/0007528 | A1 * | 1/2009 | Wilson | B01D 46/10 55/306 |
| 2009/0139200 | A1 * | 6/2009 | Colaprisco | B01D 46/12 60/39.092 |
| 2010/0083646 | A1 * | 4/2010 | Poppe | B01D 39/12 60/311 |
| 2010/0107576 | A1 * | 5/2010 | Belyew | B01D 46/0002 55/306 |
| 2010/0224554 | A1 * | 9/2010 | Schindelin | B01D 39/083 210/493.5 |
| 2010/0269467 | A1 * | 10/2010 | Crabtree | B01D 46/10 55/499 |
| 2015/0344141 | A1 * | 12/2015 | Brand | B64D 33/02 95/273 |
| 2019/0091617 | A1 * | 3/2019 | Jaber | B01D 63/067 |
| 2019/0275457 | A1 * | 9/2019 | Bergami | B01D 46/521 |

FOREIGN PATENT DOCUMENTS

| | | |
|---|---|---|
| CN | 103405975 A | 11/2013 |
| EP | 0699828 A1 | 3/1996 |
| EP | 1935472 A1 | 6/2008 |
| FR | 2523469 A1 | 9/1983 |
| WO | 99-28011 A1 | 6/1999 |
| WO | 2015042960 A1 | 4/2015 |

OTHER PUBLICATIONS

Office Action for Chinese Application No. 2020042301839690 dated Apr. 27, 2020.

Fadongji Zhuzao Gongy! ii Zhuan(J.Be! Tlaoshi) "Teaching of Key Professional Construction Planning for Automobile Manufacturing and Assembly Technology".

E. Schrufer "Changes in Relative Permittivity Caused by Changes in Humidity or Flux".

* cited by examiner

VEHICLE PROVIDED, AT THE INTAKE, WITH AN AIR FILTER PROVIDED WITH A HEATING DEVICE

TECHNICAL FIELD

The invention relates to a vehicle provided, at the intake, with an air filter provided with a heating device.

The invention finds advantageous application in an aircraft (i.e. a machine built by mankind, which stands on its and can move in the air allowing the transportation of people or things in the earth's atmosphere) and, in particular, in a helicopter, to which explicit reference will be made in the description below without losing generality.

PRIOR ART

A modern helicopter is generally provided with at least one turbine engine, which operates a complex of blades, which allow the helicopter to lift and lower itself in a vertical direction, stand still while flying, move to the side, forward and backward. The turbine engine has, at the front, an air intake, through which the turbine engine sucks in the external air needed to operate (namely, the external air containing the oxygen needed for the combustion).

Generally speaking, the air intake can comprise a metal grid with relatively large meshes (in the range of one or two centimetres), which fulfils the function of preventing birds from flying into the air intake. Between the air intake and the turbine engine there can be arranged an air filter having the function of filtering the air taken in, so as to hold back small-sized impurities (dust or the like), which, in the long term, can cause an early wear of the turbine engine.

The air filter can be used only when the temperature of the surrounding environment is (adequately) higher than zero (at the ground level and at a greater height), because the filtering material usually is hygroscopic and, therefore, has a tendency to absorb humidity from the surrounding environment: if the temperature is below zero, the humidity present in the filtering material freezes, thus forming ice, which makes up a (more or less extended) barrier that prevents air from flowing through (but the same problem would also arise with a non-hygroscopic filtering material due to the surface humidity that collects on the outer surfaces of the filtering material or due to the snow that might settle on the outer surface of the filtering material). As a consequence, when the temperature of the surrounding environment is close to or below zero, the air filter cannot be used (in particular, it is bypassed by opening one or more bypass conduits arranged in parallel to the air filter). Alternatively, the air filter can be provided with a heating device, which is designed to always keep the temperature of the filtering material at a temperature (adequately) higher than zero; however, known heating devices are fairly large and heavy (which is a very disadvantaging defect in an aircraft), as they are designed so as to direct towards the air filter some hot air jets generated by a compressor.

DESCRIPTION OF THE INVENTION

The object of the invention is to create a vehicle provided, at the intake, with an air filter provided with a heating device, which is not affected by the aforementioned drawbacks and, at the same time, can be manufactured in a straightforward and low-cost manner.

The invention suggests a vehicle provided, at the intake, with an air filter provided with a heating device as it is set forth in the appended claims.

BRIEF DESCRIPTION OF THE DRAWINGS

The invention will now be described with reference to the accompanying drawings, which show a non-limiting embodiment thereof, wherein.

PREFERRED EMBODIMENTS OF THE INVENTION

Figure 1:
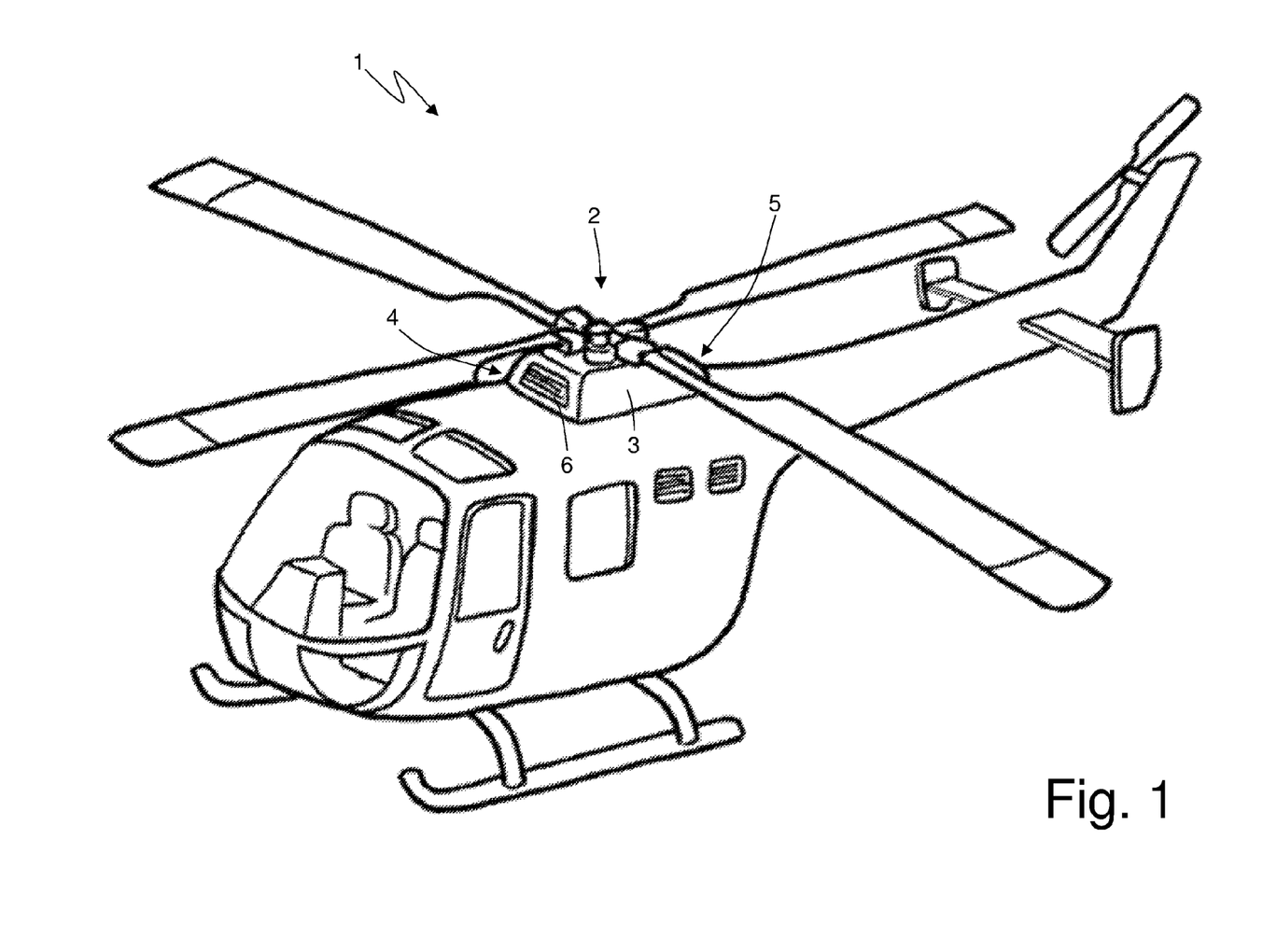
FIG. 1 is a schematic perspective view of a helicopter according to the invention.

In FIG. 1, number 1 indicates, as a whole, a helicopter comprising a turbine engine 2, which operates a complex of blades, which allow the helicopter to lift and lower itself in a vertical direction, stand still while flying, move to the side, forward and backward.

The turbine engine 2 comprises a tubular housing 3 having, at the front, an air intake opening 4 (through which the turbine engine 2 takes in the external air needed to operate, i.e. the external air containing the oxygen needed for the combustion) and, at the back, an air outlet opening 5 (through which the turbine engine 2 expels the exhaust gases produced by the combustion). In the area of the intake opening 4 there is an air filter 6 having the function of filtering the air taken in, so as to hold back small-sized impurities (dust or the like), which, in the long term, can cause an early wear of the turbine engine 2.

Figure 2:
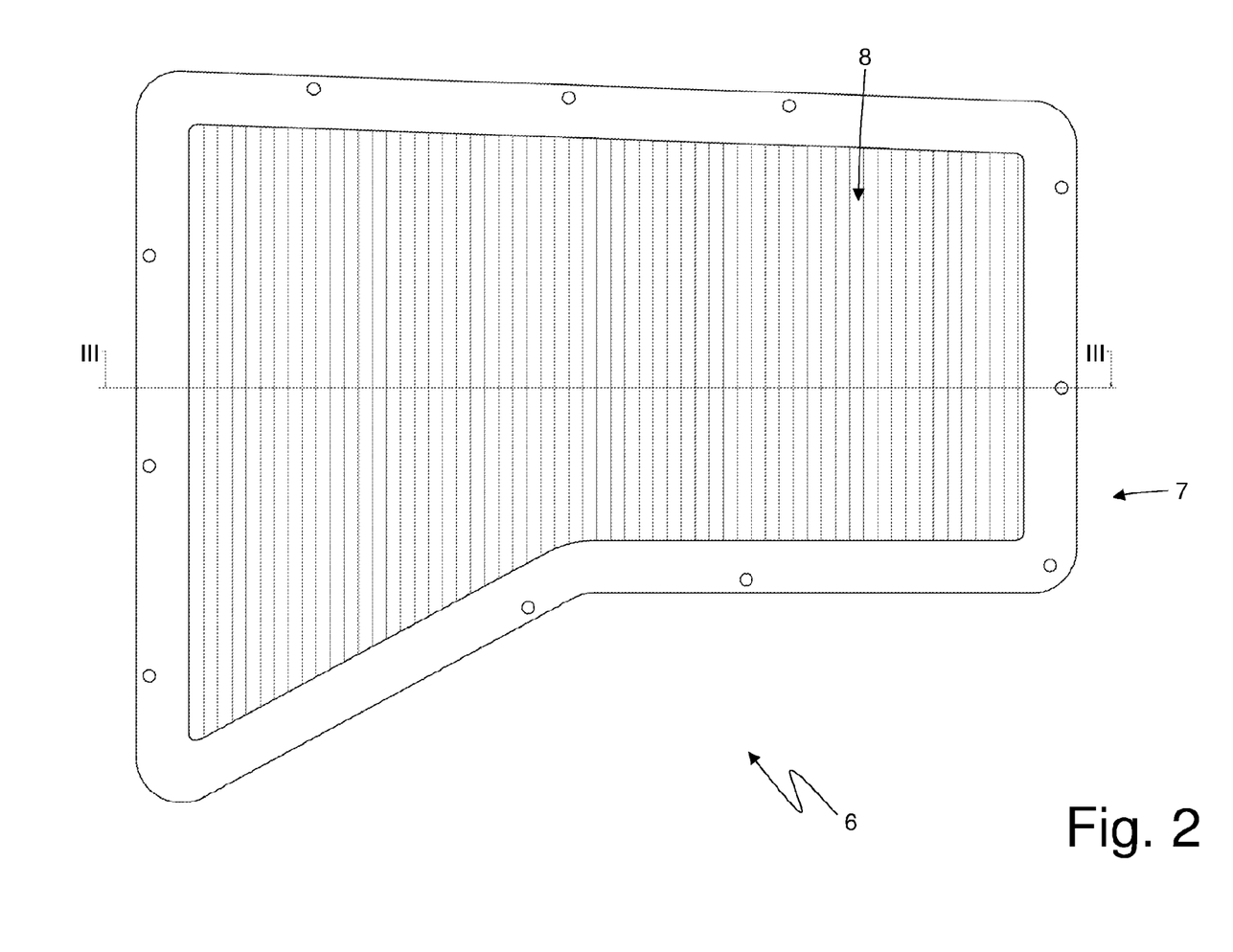
FIG. 2 shows a plan view of an air filter of the helicopter of FIG. 1.
Figure 3:
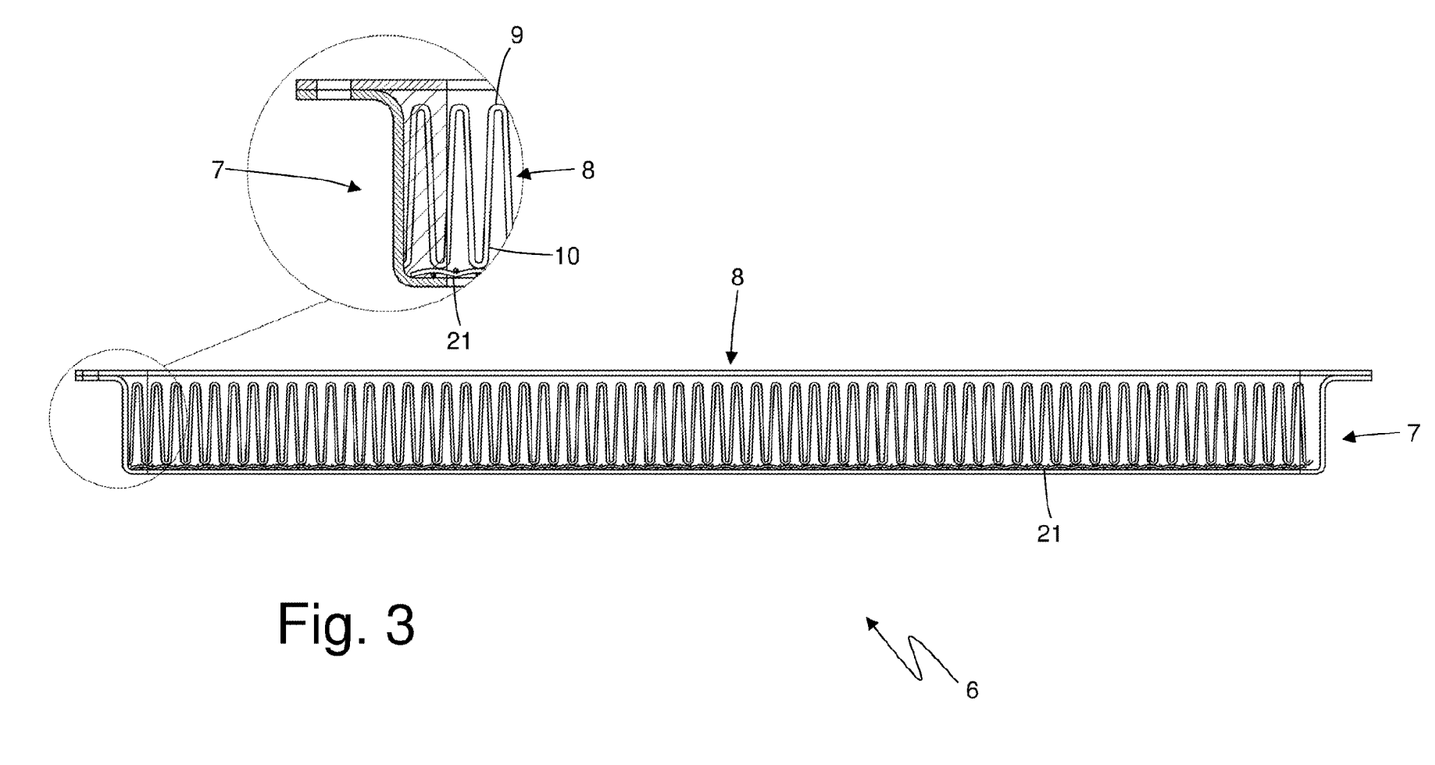
FIG. 3 is a sectional view along line III-III of the air filter of FIG. 2.
Figure 4:
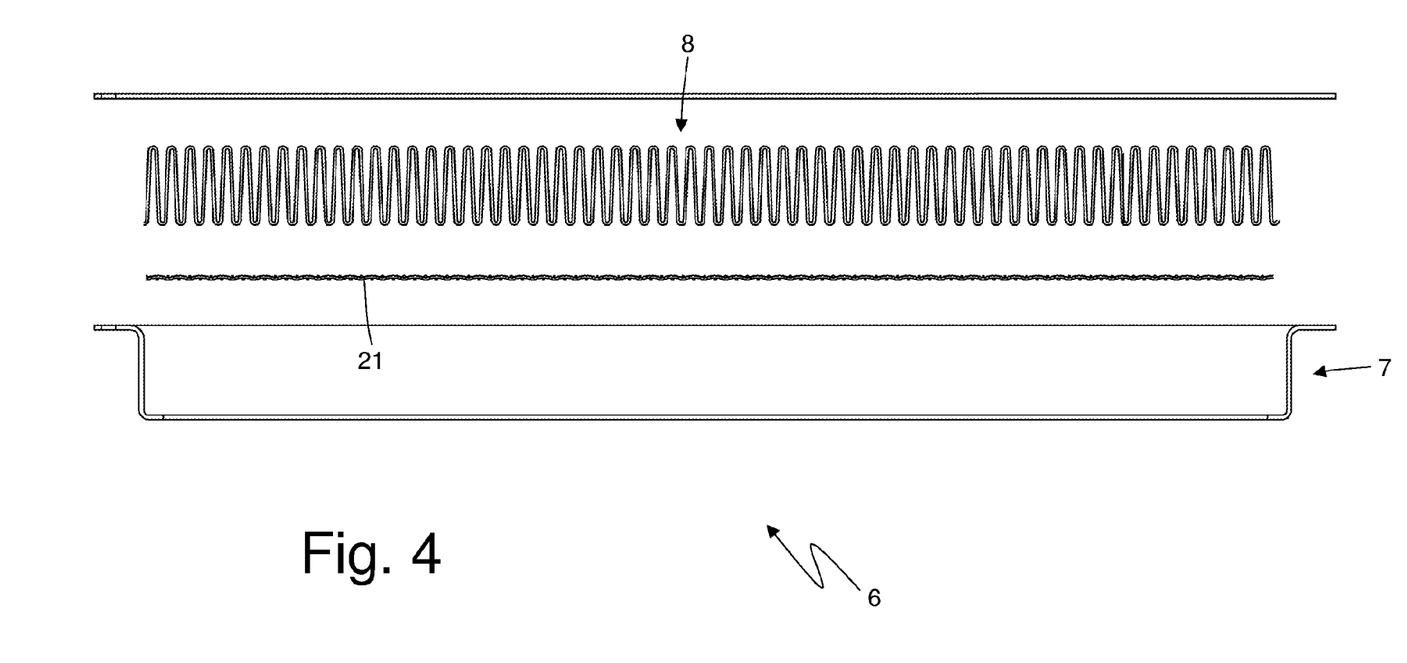
FIG. 4 is an exploded sectional view along line III-III of the air filter of FIG. 2.

According to FIGS. 2, 3 and 4, the air filter 6 comprises a perimeter frame 7 (made of aluminum, plastic material or composite material), which supports a wave-shaped filtering material element 8 (i.e. shaped like waves so as to increase the useful surface of the filtering material, given the same external dimensions), which for example is made of fabric or nonwoven fabric or cotton or other fibers. The air filter 6 comprises a thin, pleated outer reinforcement mesh 9 and a thin, pleated inner reinforcement mesh 10, which rest against opposite surfaces of the filtering material element 8 (namely, they enclose the filtering material element 8) so as to allow the filtering material element 8 to have a stable shape and resistance. In other words, the filtering material element 8 is coated on both sides by the reinforcement meshes 9 and 10 (namely, it is contained between the reinforcement meshes 9 and 10), which give shape stability to the filtering material element 8.

The outer reinforcement mesh 9 rests against an outer surface of the filtering material element 8, through which the air taken in enters so as to flow through the filtering material element 8; on the other hand, the inner reinforcement mesh 10 rests against an inner surface of the filtering material element 8, which is opposite the outer surface. In other words, the outer reinforcement mesh 9 is upstream of the filtering material element 8 relative to the air flow taken in, whereas the inner reinforcement mesh 10 is downstream of the filtering material element 8 relative to the air flow taken in.

Figure 5:
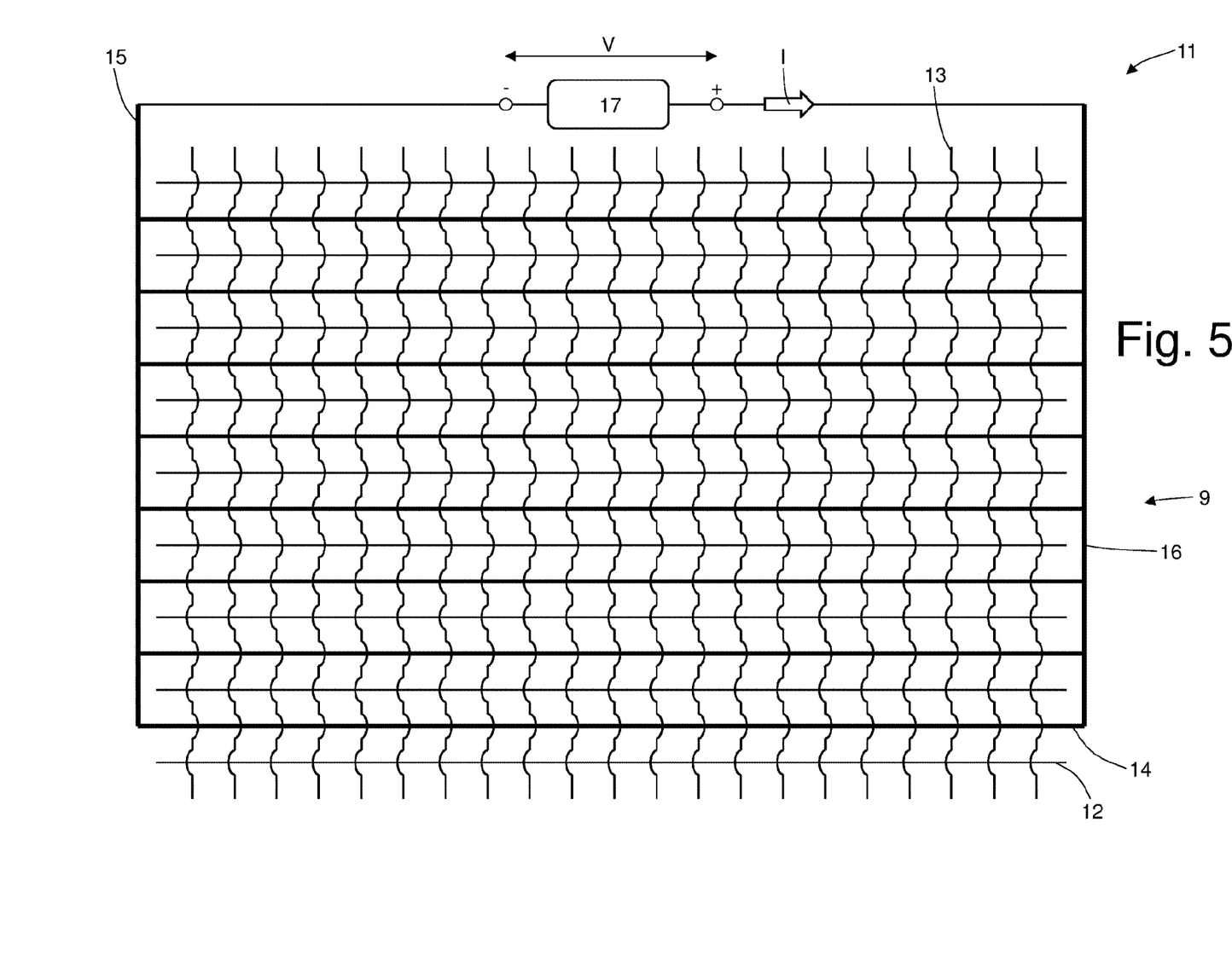
FIG. 5 is a schematic view of electrical connections of an outer reinforcement mesh of the air filter of FIG. 2.

According to FIG. 5, the air filter 6 comprises a heating device 11, which is designed to heat (when necessary) the filtering material element 8. In particular, the heating device 11 is designed to cause an electric current I to flow through at least part of the outer reinforcement mesh 9, so as to generate heat, due to Joule effect, on the inside of the outer reinforcement mesh 9. The heat generated by the outer reinforcement mesh 9 is transmitted to the filtering material element 8 both directly through heat conduction (as the outer reinforcement mesh 9 rests against an outer surface of the filtering material element 8) and indirectly by means of the air taken in, which, as it flows through the outer reinforcement mesh 9, heats up and then, subsequently, releases heat to the filtering material element 8 when it flows through the filtering material element 8 itself.

According to FIG. 5, the outer reinforcement mesh 9 consists of a plurality of warp wires 12 (namely, wires that make up the warp) and a plurality of weft wires 13 (namely, wires that make up the weft); the warp wires 12 have a linear development, whereas the weft wires 13 are inserted into the shed of the warp wires 12 passing over and under the warp wires 12. According to a preferred (though not limiting) embodiment, the heating device 11 is designed to cause the electric current I to circulate through a group of electrified wires 14, which normally belong only to the warp wires 12 or only to the weft wires 13; in other words, the heating device 11 is electrically connected only to the warp wires 12 or only to the weft wires 13; however, according to a different embodiment, the heating device 11 is electrically connected both to the warp wires 12 and to the weft wires 13, so as to cause the electric current I to circulate through the warp wires 12 and the weft wires 13. Preferably (though not necessarily), the electrified wires 14 belong only to the warp wires 12, as the warp wires 12 have a more linear development and, therefore, an outer electric insulation (usually made of insulating enamel) is subjected to smaller mechanical stresses (hence, the insulating enamel is less likely to locally break due to bending). According to a preferred (though not compulsory) embodiment shown in FIG. 5, the electrified wires 14 make up only a limited part of the warp wires 12 or they make up only a limited part of the weft wires 13.

According to FIG. 5, the heating device 11 comprises a manifold 15, which is electrically connected to a first end of the electrified wires 14, a manifold 16, which is electrically connected to a second end of the electrified wires 14, which is opposite the first end, and a device 17, which is connected to the two manifolds 15 and 16 so as to apply a potential difference V between the two manifolds 15 and 16 themselves; obviously, by applying the potential difference V between the two manifolds 15 and 16, you generate the circulation of the current I through the two manifolds 15 and 16 and, therefore, through the electrified wires 14 of the warp wires 12, which are interposed between the two manifolds 15 and 16 and connect the two manifolds 15 and 16 to one another. Generally speaking, the device 17 receives electric energy from an electric power BUS of the helicopter 1, which is capable of adjusting the value of the potential difference V applied to the manifolds 15 and so as to accordingly adjust the intensity of the electric current I and, hence, the heat generated in the electrified wires 14 due to Joule effect.

According to a preferred embodiment, the electrified wires 14 are externally coated with a coating made of an electrically insulating and heat conductor material (typically an insulating enamel); the coating of electrically insulating material is necessary to prevent the electrified wires 14 belonging to the warp wires 12 from being electrically connected to the weft wires 13 with a consequent (even very remarkable) reduction of the overall electrical resistance.

According to a preferred (though not compulsory) embodiment, the electrified wires 14 are made up of a first material, which is different from a second material making up the remaining non-electrified warp wires 12 and/or weft wires 13 and has a greater resistivity than the second material. For example, the electrified wires 14 can be made up of constantan (a binary alloy consisting of copper 60% and nickel 40%), which has, at room temperature, a resistivity of approximately $4.9 \times 10^{-7}$ Ω/m, whereas the remaining non-electrified warp wires 12 and/or the weft wires 13 can be made up of steel, which has, at room temperature, a resistivity of approximately $1.1-1.8 \times 10^{-7}$ Ω/m. Alternatively, the electrified wires 14 can be made up of nichrome (a binary alloy consisting of nickel 80% and chromium 20%), which has, at room temperature, a resistivity of approximately $108 \times 10^{-7}$ Ω/m. Alternatively the remaining non-electrified warp wires 12 and/or weft wires 13 can be made up of aluminium, which, at room temperature, has a resistivity of approximately $2.8 \times 10^{-7}$ Ω/m.

According to a possible embodiment, the electrified wires 14 can have the shape of a spiral; this embodiment has the advantage of significantly elongating the electrified wires, thus increasing their electrical resistance; however, it also suffers from the drawback of making the electrified wires 14 very flexible and, therefore, unable to offer an adequate mechanical containment for the filtering material element 8. Alternatively, according to a possible embodiment, the electrified wires 14 each comprise a central support wire, which is not flown through by the electric current I (as it fulfils the sole function of ensuring an adequate mechanical containment of the filtering material element 8), and a conductor wire, which is flown through by the electric current I, is wound in a spiral shape around the central support wire, and is electrically insulated relative to the central support wire.

As a whole, the electrified wires 14 should have a relatively high electrical resistance so as to prevent the potential difference V applied by the device 17 from being too small and, consequently, the electric current I from being too high. As a matter of fact, manufacturers produce devices 17 that are capable of generating—with a good precision—a potential difference V in the range of some dozens or a few hundreds of Volts, delivering electric currents I that are not too high (at the most in the range of some dozens of Amperes); on the other hands, users can find it difficult (hence, expensive) to find a device 17 that is capable of generating a potential difference V in the range of a few Volts, delivering very high electric currents (up to hundreds of Amperes). As a consequence, the overall electrical resistance available at the ends of the device 17 must be sufficiently high, so as to enable the use of a device 17 that can be easily found in the market; this result is obtained by choosing, for the electrified wires 14, a material with a high electrical resistivity, by selecting the type of connection of the electrified wires 14 to the device, and/or by selecting the length and the cross section of the electrified wires 14.

Figure 6:
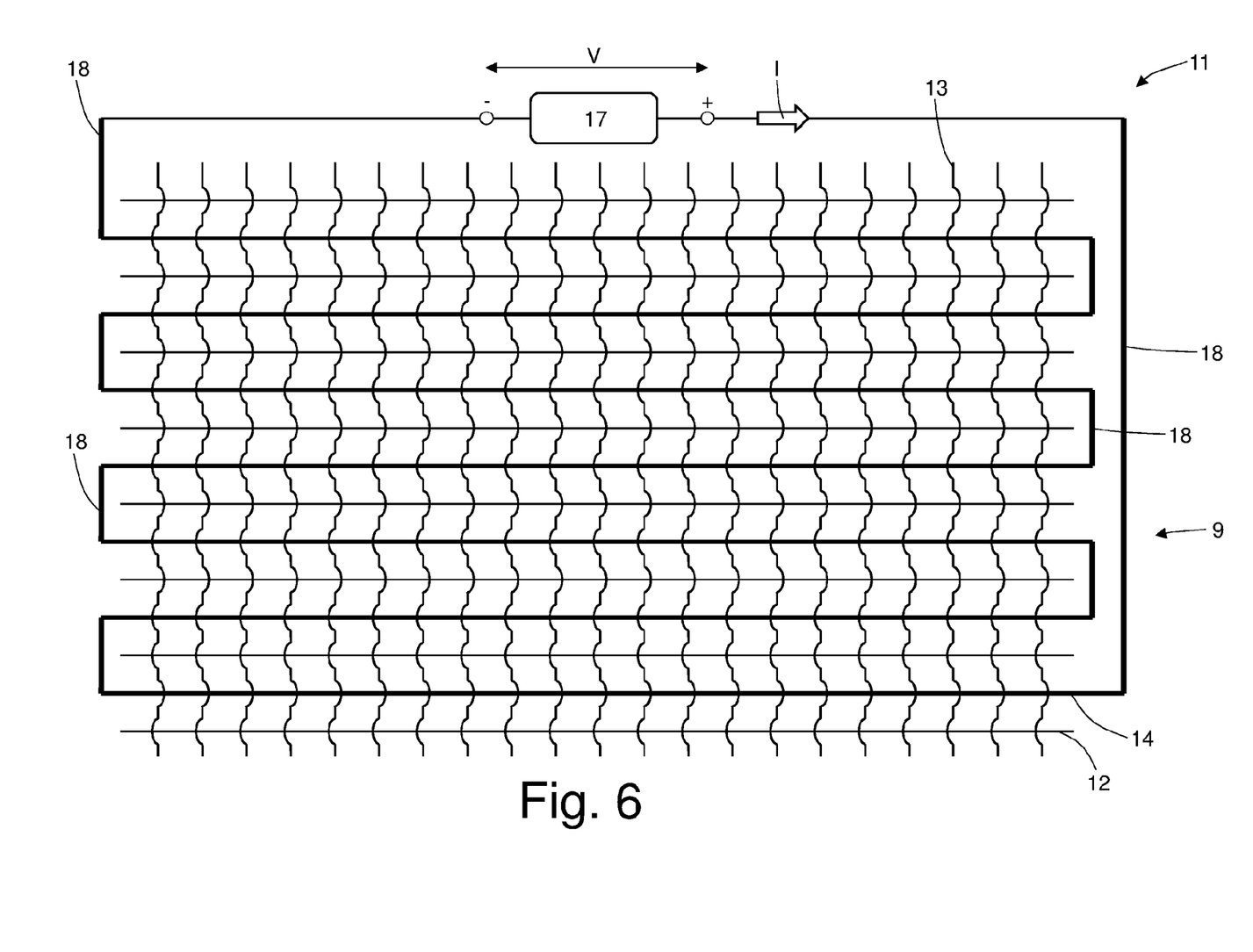
FIG. 6 is a schematic view of an alternative embodiment of the electrical connections of the outer reinforcement mesh of FIG. 5.

In the embodiment shown in FIG. 5, the electrified wires 14 are connected to one another in parallel by means of the manifolds 15 and 16; this embodiment suffers from the drawback of reducing the overall electrical resistance available at the ends of the device 17, but it also has the advantage of ensuring the operation of the heating device even in case of interruption (breaking) of some electrified wires 14. In the alternative embodiment shown in FIG. 6, the electrified wires 14 are connected to one another in series by means of connection bridges 18; this embodiment has the advantage of increasing the overall electrical resistance available at the ends of the device 17, but it also suffers from the drawback of interrupting the operation of the heating device 11 in case of interruption (breaking) of an electrified wire 14. Obviously, according to variants that are not shown herein, the electrified wires 14 can be connected to one another partly in series and partly in parallel, thus creating an intermediate solution between the connection entirely in parallel shown in FIG. 5 and the connection entirely in series shown in FIG. 6.

According to a preferred embodiment, the heating device 11 controls the potential difference V applied by the device 17 (namely, the electric current I flowing through the electrified wires 14) in a feedback loop, using—as feedback variable—the actual temperature of the filtering material element 8 and so as to pursue a desired temperature of the filtering material element 8. In order to carry out the above-mentioned feedback loop control, the heating device 11 must determine in real time the actual temperature of the filtering material element 8; according to a possible embodiment, the filtering material element 8 is coupled to a temperature sensor, which can be buried inside the filtering material element 8 or can rest on the outer or inner surface of the filtering material element 8. Alternatively, the heating device 11 estimates the actual temperature of the filtering material element 8 based on the actual temperature of the electrified wires 14, namely the heating device 11 determines the actual temperature of the electrified wires 14 and estimates the actual temperature of the filtering material element 8 based on the actual temperature of the electrified wires 14; for example, the heating device 11 determines the actual electrical resistance of the electrified wires 14 through which the electric current I flows and determines the actual temperature of the electrified wires 14 based on the actual electrical resistance of the electrified wires 14 (using the known relationship existing between the electrical resistivity of a conductor and the corresponding temperature).

The heating device 11 is activated both automatically based on the actual temperature of the filtering material element 8 and manually by the driver of the helicopter 1.

According to a preferred embodiment, the device 17 (which comprises, on the inside, all the relative electronic control devices) is caused to be integral to the perimeter frame 6, so that the air filter 6 and the heating device 11 form one single unit, which is compact and can be easily assembled/disassembled.

Figure 7:
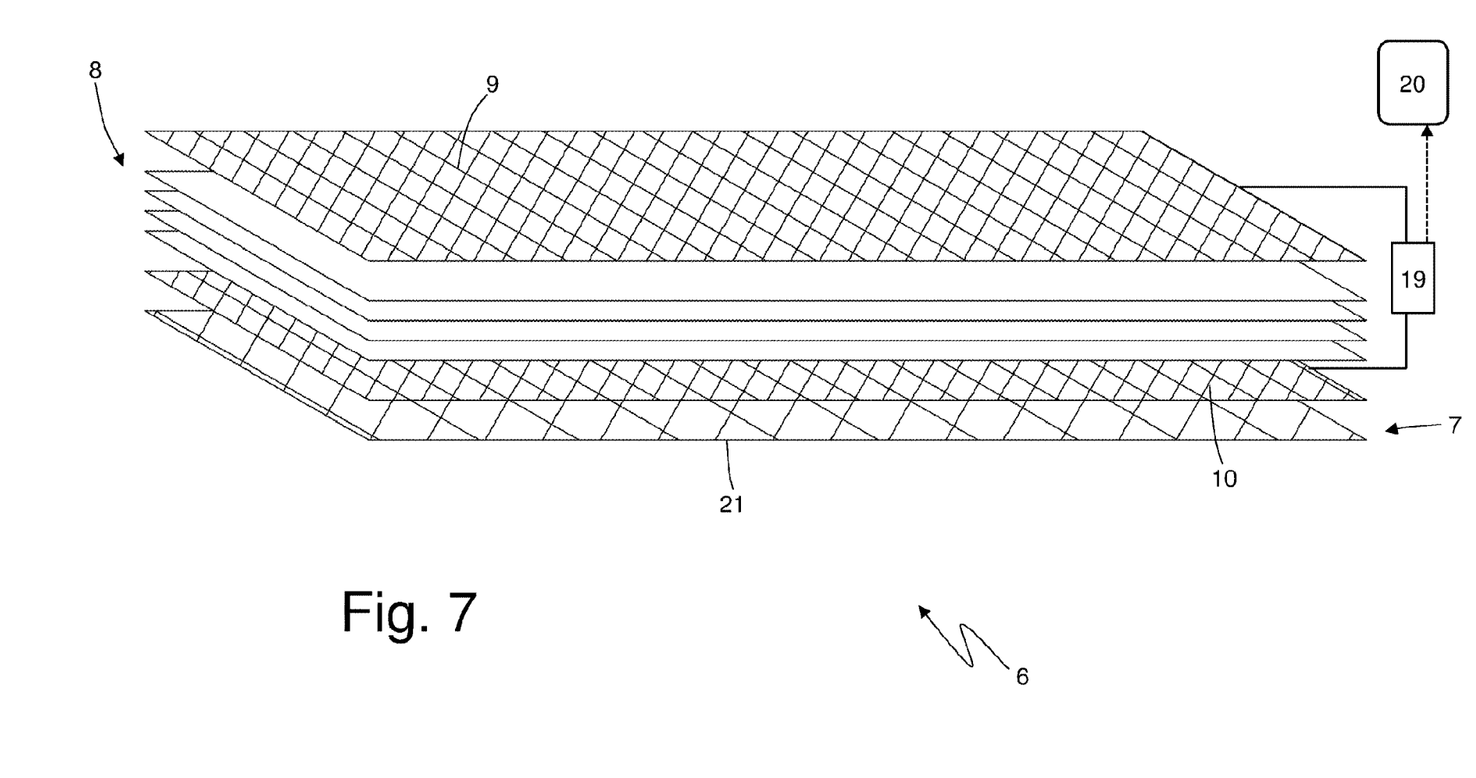
FIG. 7 is a schematic view of part of the air filter of FIG. 2 coupled to a capacitive sensor.

According to a possible embodiment shown in FIG. 7, there is provided a known capacitive sensor 19, which is designed to measure the electrical capacitance existing between the two reinforcement meshes 9 and 10 (electrical capacitance is a scalar physical quantity, which quantifies the tendency of a conductor body to increase its electric potential value if it is supplied with an electric charge, namely it measures the inclination to store electric charges). The capacitive sensor 19 communicates with a processing device 20, which determines a feature of the filtering material element 8 (also) based on the electrical capacitance existing between the two reinforcement meshes 9 and 10, which is measured by the capacitive sensor 19.

Preferably, the processing device 20 determines a percentage of humidity of the filtering material element 8, a flow rate of the air flowing through the filtering material element 8, and/or a degree of clogging of the filtering material element 8 based on the electrical capacitance existing between the two reinforcement meshes 9 and 10; obviously, the processing device 20 can determine all the three above-mentioned features of the filtering material element 8, can determine two of the three above-mentioned features of the filtering material element 8, or can determine only one of the three above-mentioned features of the filtering material element 8.

By changing the flow rate of the air flowing through the filtering material element 8, you can change the tendency of the filtering material element 8 to store electric charges and, therefore, you can accordingly change the electrical capacitance existing between the two reinforcement meshes 9 and 10; therefore, you can experimentally determine a map that associates each value of the electrical capacitance existing between the two reinforcement meshes 9 and 10 with a corresponding value of the flow rate of the air flowing through the filtering material element 8. The flow rate of the air flowing through the filtering material element 8 varies within short times (even a few seconds) and, therefore, in order to determine the variation of the flow rate of the air flowing through the filtering material element 8, you need to evaluate the variation of the electrical capacitance existing between the two reinforcement meshes 9 and 10 occurring over a short period of time. According to a preferred embodiment, the flow rate of the air flowing through the filtering material element 8 is also determined based on the speed of rotation of the turbine engine 2 by correlating the variation of the electrical capacitance existing between the two reinforcement meshes 9 and 10 with the variation of the speed of rotation of the turbine engine 2.

By changing the humidity of the filtering material element 8, you can change the tendency of the filtering material element 8 to store electric charges and, therefore, you can accordingly change the electrical capacitance existing between the two reinforcement meshes 9 and 10; therefore, you can experimentally determine a map that associates each value of the electrical capacitance existing between the two reinforcement meshes 9 and 10 with a corresponding value of the humidity of the filtering material element 8. According to a preferred embodiment, the value of the humidity of the filtering material element 8 is determined also based on the temperature of the filtering material element 8.

By changing the degree of clogging of the filtering material element 8 (namely, the quantity of foreign material trapped in the filtering material element 8), you can change the tendency of the filtering material element 8 to store electric charges and, therefore, you can accordingly change the electrical capacitance existing between the two reinforcement meshes 9 and 10; therefore, you can experimentally determine a map that associates each value of the electrical capacitance existing between the two reinforcement meshes 9 and 10 with a corresponding value of the degree of clogging of the filtering material element 8. The clogging of the filtering material element 8 increases over relatively long amounts of time (many hours or many days of operation); therefore, in order to determine the variation of the clogging of the filtering material element 8, you need to evaluate the variation of the electrical capacitance existing between the two reinforcement meshes 9 and 10 occurring over a long period of time.

According to a preferred (though not compulsory) embodiment shown in FIGS. 2, 3 and 4, the air filter 6 also comprises a flat stiffening mesh 21, which is arranged on the inside and fulfils the function of helping the wave-shaped filtering material element 8 bear—without deformations—the pressure stresses determined by the air being sucked in; the function of the stiffening mesh 21 is particularly important in case of filtering material elements 8 having a large surface.

In the embodiment shown in the accompanying drawings, the air filter 6 comprises the outer reinforcement mesh 9 and the inner reinforcement mesh 10; according to alternative embodiments, which are not shown herein, the air filter 6 could comprise only the outer reinforcement mesh 9, only the inner reinforcement mesh 10, only a central reinforcement mesh (buried inside the filtering material element 8) or the central reinforcement mesh in addition of the reinforcement meshes 9 and 10; preferably, the sole central reinforcement mesh (obviously, if available) or the sole outer reinforcement mesh 9 (in the absence of the central reinforcement mesh) is electrified. Generally speaking, electrifying the inner reinforcement mesh 10 is not advisable, as the inner reinforcement mesh 10 can heat the filtering material element 8 only directly through heat conduction and not indirectly through the air taken in (which flows through the inner reinforcement mesh 10 only after having flown through the filtering material element 8).

In the embodiment shown in the accompanying drawings, the air filter 6 has an approximately rectangular, flat shape (and, consequently, the filtering element 8 has the same shape), but, of course, the air filter 6 (hence, the filtering element 8) can have any other shape, so as to adjust to the shape of the air intake; by way of example, the air filter 6 (hence, the filtering element 8) could have a circular or elliptical, flat shape, a cylindrical shape, a conical shape, the shape of a truncated cone . . . .

The embodiment shown by mere way of example in the accompanying drawings relates to a helicopter 1, but the invention can find advantageous application in any other type of aircraft or vehicle.

The helicopter 1 described above has numerous advantages.

First of all, the helicopter 1 describe above comprises an air filter 6, which is provided with a heating device 11 that is extremely effective and efficient (i.e. is capable of heating the filtering material element 8 in a very effective and efficient manner), as it is coupled to the filtering material element 8 both in a direct fashion (i.e. the heat generated by the heating device 11 directly reaches the filtering material element 8) and in a distributed fashion (i.e. the heat generated by the heating device 11 reaches the entire extension of the filtering material element 8).

Furthermore, the helicopter 1 described above comprises an air filter 6, which is provided with a heating device 11 that is particularly economic, light and small, as it exploits an element (the outer reinforcement mesh 9) that is already present in the air filter 6.

Finally, the helicopter 1 described above comprises an air filter 6, which is capable of determining—in a sufficiently precise manner—the state (clogging) of the filtering material element 8, the percentage of humidity of the filtering material element 8, and/or the flow rate of the air flowing through the filtering material element 8 by measuring the electrical capacitance existing between the two reinforcement meshes 9 and 10.

The invention claimed is:

1. A vehicle provided with an engine, at least one air intake opening through which the engine takes in the external air needed to operate, and an air filter, which is arranged in the area of the air intake opening; the air filter comprises:

at least one wave-shaped filtering material element;

an outer reinforcement mesh, which is pleated, is made up of a plurality of weft wires and a plurality of warp wires, and rests against an outer surface of the filtering material element, through which the air taken in enters so as to flow through the filtering material element;

an inner reinforcement mesh, which is pleated, is made up of a plurality of weft wires and a plurality of warp wires, and rests against an inner surface of the filtering material element, which is opposite the outer surface; and a heating device, which is designed to heat the filtering material element;

wherein the heating device is electrically connected to a group of electrified wires of the outer reinforcement mesh and is designed to cause an electric current to flow through the electrified wires, so as to generate heat, due to Joule effect, on the inside of the outer reinforcement mesh; and wherein the electrified wires are externally coated with a coating made of an electrically insulating material.

2. The vehicle according to claim 1, wherein the heating device is designed to cause the electric current to circulate only through the outer reinforcement mesh and not through the inner reinforcement mesh.

3. The vehicle according to claim 1, wherein the electrified wires belong only to the weft wires or only to the warp wires.

4. The vehicle according to claim 3, wherein the electrified wires belong only to the weft wires.

5. The vehicle according to claim 3, wherein the electrified wires make up only a limited part of the wires constituting the weft or of the wires constituting the warp.

6. The vehicle according to claim 1, wherein the heating device comprises: a first manifold, which is electrically connected to a first end of the electrified wires; a second manifold, which is electrically connected to a second end of the electrified wires, which is opposite the first end; and a device, which is connected to the two manifolds so as to apply a potential difference between the two manifolds themselves.

7. The vehicle according to claim 1, wherein the electrified wires are externally coated with a coating made of an electrically insulating and heat conductor material.

8. The vehicle according to claim 1, wherein the electrified wires are made up of a first material, which is different from a second material making up the remaining non-electrified wires and has a greater resistivity than the second material.

9. The vehicle according to claim 8, wherein the electrified wires are made up of constantan and the remaining non-electrified wires are made up of aluminium.

10. The vehicle according to claim 1, wherein the electrified wires each comprise a central support wire, which is not flown through by the electric current, and a conductor wire, which is flown through by the electric current, is wound in a spiral shape around the central support wire, and is electrically insulated relative to the central support wire.

11. The vehicle according to claim 1, wherein the heating device determines the electrical resistance of the electrified wires through which the electric current flows and it determines the temperature of the electrified wires based on the electrical resistance of the electrified wires.

12. The vehicle according to claim 1 and comprising a perimeter frame, which supports the filtering material element and houses the heating device.

13. The vehicle according to claim 1 and comprising a capacitive sensor, which is designed to measure the electrical capacitance existing between the two reinforcement meshes.

14. The vehicle according to claim 13 and comprising a processing device, which determines a feature of the filtering material element based on the electrical capacitance existing between the two reinforcement meshes.

15. The vehicle according to claim 14, wherein the processing device determines a percentage of humidity of the filtering material element, a flow rate of the air flowing through the filtering material element, and/or a degree of clogging of the filtering material element based on the electrical capacitance existing between the two reinforcement meshes.

* * * * *